(12) United States Patent
Fischer et al.

(10) Patent No.: US 9,544,300 B2
(45) Date of Patent: Jan. 10, 2017

(54) METHOD AND SYSTEM FOR PROVIDING DEVICE-SPECIFIC OPERATOR DATA FOR AN AUTOMATION DEVICE IN AN AUTOMATION INSTALLATION

(75) Inventors: Kai Fischer, Baldham (DE); Steffen Fries, Baldham (DE); Juergen Gessner, Forstinning (DE); Amine Mohamed Houyou, Munich (DE); Hans-Peter Huth, Munich (DE); Angela Schattleitner, Tuntenhausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/237,824

(22) PCT Filed: Aug. 8, 2012

(86) PCT No.: PCT/EP2012/065489
§ 371 (c)(1),
(2), (4) Date: Feb. 7, 2014

(87) PCT Pub. No.: WO2013/029940
PCT Pub. Date: Mar. 7, 2013

(65) Prior Publication Data
US 2014/0173688 A1    Jun. 19, 2014

(30) Foreign Application Priority Data
Aug. 30, 2011    (DE) .................. 10 2011 081 804

(51) Int. Cl.
*H04L 29/06*    (2006.01)
*G05B 19/042*    (2006.01)
*H04L 9/32*    (2006.01)

(52) U.S. Cl.
CPC ....... *H04L 63/0823* (2013.01); *G05B 19/0428* (2013.01); *H04L 9/321* (2013.01); *H04L 9/3263* (2013.01)

(58) Field of Classification Search
CPC .... H04L 63/0823; H04L 9/321; H04L 9/3263; G05B 19/0428
(Continued)

(56) References Cited

U.S. PATENT DOCUMENTS 6,631,476 B1 * 10/2003 Vandesteeg et al. .......... 714/4.4
8,037,308 B2 * 10/2011 Miyazawa .................... 713/175
(Continued)

FOREIGN PATENT DOCUMENTS

CN    1930565    3/2007
CN    101460954    6/2009
(Continued)

OTHER PUBLICATIONS

Huang R. et al., "Research on OPC UA Security"; Industrial Electronics and Applications (ICIEA), 2010 The 5th IEEE Conference on, IEEE, Piscataway, NJ; pp. 1439-1444; ISBN: 978-1-4244-5045-9; XP031711638; 2010; us; Jun. 15, 2010.
(Continued)

*Primary Examiner* — Sarah Su
(74) *Attorney, Agent, or Firm* — Cozen O'Connor

(57) ABSTRACT

Method and system for providing device-specific operator data for an automation device in an automation installation, which automation device authenticates itself to an authentication server in the automation installation via at least one authentication credential, wherein if up-to-date device-specific operator data from the installation operator of the automation installation are available for the automation
(Continued)

device, then the up-to-date device-specific operator data are tied to the authentication credential of the authentication device.

21 Claims, 4 Drawing Sheets

(58) Field of Classification Search
USPC .......................................... 726/1, 4; 713/156
See application file for complete search history.

(56) References Cited

U.S. PATENT DOCUMENTS

| | | | |
|---|---|---|---|
| 8,966,260 B1* | 2/2015 | Walter | H04L 63/08 713/156 |
| 2003/0014149 A1* | 1/2003 | Kreidler et al. | 700/169 |
| 2004/0054907 A1* | 3/2004 | Chateau et al. | 713/175 |
| 2005/0229004 A1* | 10/2005 | Callaghan | 713/185 |
| 2006/0235973 A1* | 10/2006 | McBride et al. | 709/226 |
| 2007/0067512 A1* | 3/2007 | Donaires et al. | 710/62 |
| 2008/0209207 A1* | 8/2008 | Parupudi et al. | 713/156 |
| 2008/0237337 A1* | 10/2008 | Drackett et al. | 235/380 |
| 2008/0310337 A1* | 12/2008 | Welles | H04L 12/2697 370/311 |
| 2009/0249074 A1* | 10/2009 | Madhavan et al. | 713/176 |
| 2009/0271851 A1* | 10/2009 | Hoppe | G06F 21/31 726/6 |
| 2010/0268955 A1* | 10/2010 | Ohno | H04L 63/0428 713/171 |
| 2010/0313259 A1* | 12/2010 | Fries et al. | 726/10 |
| 2011/0238996 A1* | 9/2011 | Xiao et al. | 713/175 |
| 2012/0079268 A1* | 3/2012 | Zhong et al. | 713/156 |
| 2013/0132541 A1* | 5/2013 | Falk et al. | 709/222 |
| 2013/0138818 A1* | 5/2013 | Wolf | 709/227 |
| 2014/0223528 A1* | 8/2014 | Slutsker | H04L 63/08 726/6 |
| 2015/0035643 A1* | 2/2015 | Kursun | G07C 9/00158 340/5.52 |

FOREIGN PATENT DOCUMENTS

| | | | |
|---|---|---|---|
| CN | 101582152 | 11/2009 | |
| DE | 102010038458 | 2/2012 | |
| EP | 2333624 | 6/2011 | |
| JP | WO 2006046720 A1 * | 5/2006 | ............ H04W 12/06 |
| WO | WO 0146765 | 6/2001 | |

OTHER PUBLICATIONS

Mahnke, W.; et al., opc UNIFIED Architecture. In: at-Automatisierungstechnik, Band 59, Jul. 2011, vol. 7, pp. 397-404.

Leitner S.-H. et al., "OPC UA—Service-oriented Architecture for Industrial Applications", In: Workshop der Fachgruppen Objektorientierte Softwareentwicklung; pp. 1-6; URL; XP007909798; 2006, Oct. 27, 2006.

Park, Joon S., Smart Certificates: Extending X.509 for Secure Attribute Services on the Web. In: Proceedings of $22^{nd}$ National Information Systems Security Conference, 1999, s. 1-12.

Renjie et al. Research on OPC UA Security. In: Industrial Electronics and Applications (ICIEA), 2010 the $5^{th}$ IEEE Conference, 2010, pp. 1439-1444.

Mahnke et al. "OPC Unified Architecture", pp. 191-253, 2009.

* cited by examiner

METHOD AND SYSTEM FOR PROVIDING DEVICE-SPECIFIC OPERATOR DATA FOR AN AUTOMATION DEVICE IN AN AUTOMATION INSTALLATION

REFERENCE TO RELATED APPLICATIONS

This is a U.S. national stage of application No. PCT/EP2012/065489 filed 8 Aug. 2012. Priority is claimed on German Application No. 10 2011 081 804.9 filed 30 Aug. 2011, the content of which is incorporated herein by reference in its entirety.

BACKGROUND OF THE INVENTION

1. Field of the Invention

The invention relates to a method and a system for providing device-specific operator data for an automation device in an automation installation and, more particularly, to a method and system for providing device-specific operator data for an automation controller, particularly a PLC controller or a field device, that is connected to a field bus.

2. Description of the Related Art

Automation devices need to be configured before they can be used in conjunction with other automation devices in an automation installation. In conventional automation installations or automation systems, parameterization of the automation devices is therefore performed before the devices are actually used. This parameterization may contain general configuration data, for example, an IP address or else use-specific configuration data, for example, switching times for the automation device. In addition, it is possible for the automation devices to be reconfigured during operation. Security against manipulations is becoming more and more of an integral part of such automation devices. As a result, automation devices are increasingly being delivered with security features or authentication credentials. In conventional automation installations, device-specific operator data from an installation operator of the automation installation are provided for the automation devices in unprotected form, which means that third parties are able to manipulate these data so long as they gain access to the automation installation.

SUMMARY OF THE INVENTION

It is therefore an object of the present invention to provide a method and a system for securely providing device-specific operator data for an automation device in an automation installation that afford third parties no opportunity to manipulate device-specific operator data from the installation operator of the automation installation, even if they gain access to the automation installation.

This and other objects are achieved in accordance with the invention by a method for providing device-specific operator data for an automation device in an automation installation, which automation device uses at least one authentication credential to authenticate itself to an authentication server in the automation installation, where the existence of current device-specific operator data from the installation operator of the automation installation for the automation device prompts the current device-specific operator data to be linked to the authentication credential of the automation device.

In one possible embodiment of the method according to the invention, the authentication credential is formed by a device certificate of the automation device.

In another possible embodiment of the method according to the invention, the current device-specific operator data for the automation device have configuration data for configurations of the automation device.

In a further possible embodiment of the method according to the invention, the current device-specific operator data for the automation device have firmware data for the automation device.

In a still further possible embodiment of the method according to the invention, the current device-specific operator data for the automation device have parameter data from devices that are controlled by the automation device.

In a another possible embodiment of the method according to the invention, the current device-specific operator data are written to an attribute certificate for the device certificate of the automation device to link the current device-specific operator data to the device certificate of the automation device.

In yet a further possible embodiment of the method according to the invention, an address for addressing the current device-specific operator data is written to the device certificate of the automation device to link the current device-specific operator data to the device certificate of the automation device.

In a further possible embodiment of the method according to the invention, the address for addressing the current device-specific operator data is ascertained using a device-specific serial number that the device certificate of the automation device contains.

In a another possible embodiment of the method according to the invention, the current device-specific operator data are written as coded attribute data to the device certificate of the automation device to link the current device-specific operator data to the device certificate of the automation device.

In a further possible embodiment of the method according to the invention, the automation device enquires, at regular intervals of time or when an event occurs, whether current device-specific operator data from the installation operator are existent for the automation device.

In a further possible embodiment of the method according to the invention, the current device-specific operator data are linked to the authentication credential by a policy enforcement server in the automation installation.

In one possible embodiment of the method according to the invention, the policy enforcement server obtains the current device-specific operator data from a configuration server.

In a further possible embodiment of the method according to the invention, the policy enforcement server links the current device-specific operator data to the authentication credential after the authentication server has notified the policy enforcement server of the successful authentication of the automation device to the authentication server.

In a further possible embodiment of the method according to the invention, the current device-specific operator data are digitally signed.

In a another possible embodiment of the method according to the invention, the at least one authentication credential has a device certificate, a cryptographic key and/or a cryptographic key pair.

It is also an object of the invention to provide a system for providing device-specific operator data for an automation device in an automation installation.

In accordance with the invention, the system provides device-specific operator data for an automation device in an automation installation, which automation device uses at least one authentication credential to authenticate itself to an authentication server in the automation installation, where the presence of current device-specific operator data from the installation operator of the automation installation for the automation device prompts these current, device-specific operator data to be linked to the authentication credential of the automation device by a policy enforcement server in the automation installation.

In one possible embodiment of the system according to the invention, the policy enforcement server obtains the current device-specific operator data from a configuration server and links the operator data to the authentication credential of the automation device as soon as the policy enforcement server is notified of the successful authentication of the automation device to the authentication server of the automation installation.

In one possible embodiment of the system according to the invention, the automation device has an automation controller, a PLC controller or a field device.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Possible embodiments of the method according to the invention and the system according to the invention for providing device-specific operator data for an automation device in an automation installation are described in more detail below with reference to the appended figures, in which.

DETAILED DESCRIPTION OF THE PREFERRED EMBODIMENTS

The system according to the invention and the method according to the invention for providing device-specific operator data for an automation device in an automation installation are described below with reference to an exemplary embodiment.

Figure 1:
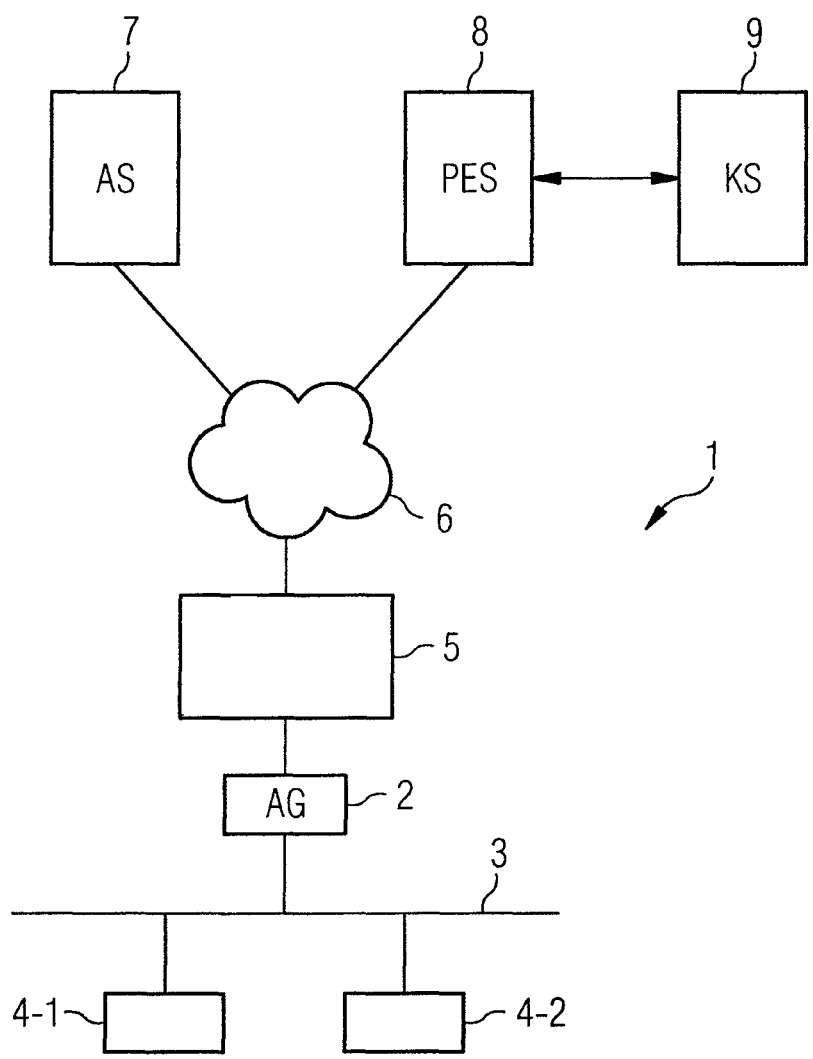
FIG. 1 shows a block diagram to illustrate a possible exemplary embodiment of a system for providing device-specific operator data for an automation device in an automation installation in accordance with the invention.

As can be seen from FIG. 1, an automation installation 1 in the illustrated exemplary embodiment has at least one automation device 2 that can be connected to further devices 4-1, 4-2 via a field bus 3, for example. The further devices 4-1, 4-2 may be automation devices, particularly field devices. In one possible embodiment, the automation device 2 is an automation controller for actuating further devices 4-1, 4-2 via a bus, particularly a field bus 3. In addition, the automation device 2 may be a PLC controller or a field device. In the exemplary embodiment shown in FIG. 1, the automation device 2 is connected to a data network 6 via a network access switch 5. This data network 6 has an authentication server 7 and a policy enforcement server 8 connected to it. In addition, the policy enforcement server 8 may be connected to a configuration server 9 via the network 6 or directly. The automation device 2 has at least one authentication credential that the automation device can use to authenticate itself to the authentication server 7 of the automation installation 1. This authentication credential may be a device certificate Z of the automation device 2, for example. The existence of current device-specific operator data from the installation operator of the automation installation 1 for an automation device 2 prompts these current device-specific operator data to be linked to the authentication credential of the automation device 2. In one possible embodiment, this linking of the current device-specific operator data to the authentication credential can be effected by the policy enforcement server 8 (see FIG. 1) of the automation installation 1. The policy enforcement server 8 links the current device-specific operator data as soon as the policy enforcement server 8 is notified of successful authentication of the automation device 5 to the authentication server 7 of the automation installation 1. In one possible embodiment, the policy enforcement server 8 obtains the current device-specific operator data from the configuration server 9.

In another possible embodiment, the current device-specific operator data for the automation device 2 have configuration data for configuring the automation device 2. In addition, the current device-specific operator data for the automation device 2 may also comprise firmware data for the automation device 2. In addition, it is possible for the current device-specific operator data for the automation device 2 to have parameter data from devices that are controlled by the automation device 2. By way of example, these parameter data comprise data from the devices 4-1, 4-2 shown in FIG. 1, which are connected to the automation device 2 via the field bus 3 and are possibly controlled by the automation device 2. By way of example, these current device-specific operator data can be provided by the configuration server 9 shown in FIG. 1. In one possible embodiment, the linking of the current device-specific operator data to the authentication credential of the automation device 2 is effected by the policy enforcement server 8 (see FIG. 1) of the automation installation 1. In an alternative embodiment, the linking of the device-specific operator data from the installation operator to the authentication credential can also be effected directly by the authentication server 7. By way of example, the authentication server 7 may be an AAA server. In one possible embodiment, the authentication server 7 is a radius server for performing the authentication of the automation device 2. In another embodiment, the authentication server 7 obtains the device-specific operator data from a configuration server 9 directly, for example. In one possible embodiment, the current device-specific operator data are digitally signed.

In a further embodiment, the authentication credential used is formed by a device certificate Z of the automation device 2. In order to link the current device-specific operator data to the device certificate Z of the automation device 2, one embodiment involves the current device-specific operator data being written to an attribute certificate for the device certificate Z of the automation device 2. In a further alternative embodiment, the device-specific operator data are linked to the device certificate Z of the automation device 2 by virtue of an address for addressing the current device-specific operator data being written to the device certificate Z of the automation device 2. In another possible embodiment, this involves the address for addressing the current device-specific operator data being ascertained using a device-specific serial number that the device certificate Z of the automation device 2 contains.

In a further possible embodiment, the current device-specific operator data are written as coded attribute data to the device certificate Z of the automation device 2 to link the current device-specific operator data to the device certificate Z of the automation device 2.

In another possible embodiment, the automation device 2 enquires, at regular intervals of time, whether current device-specific operator data from the installation operator are existent for the automation device 2, the operator data being provided by the configuration server 9, for example. In a further possible embodiment, the automation device 2 enquires, upon the occurrence of a particular event, whether current device-specific operator data from the installation operator are existent for the automation device 2. In a further possible embodiment, the authentication credential is formed by a cryptographic key or a cryptographic key pair.

In another possible embodiment, the system in accordance with the invention involves the use of a certificate Z, particularly a device certificate of the automation device 2, for transporting device-specific operator data from the operator of the automation installation 1, particularly for transporting configuration data. In addition, in a further possible embodiment, the operator data may contain an entire device image or a piece of firmware for embedded devices or portions of the operating system, particularly libraries or applications or portions thereof. By way of example, these data may be attuned to the general capabilities of the device class or else of the specific device type of the automation device 2, and in yet another possible embodiment they can take account of a specific software version level for the particular device type of the automation device 2. In this way, it is also possible to support the download of security patches when it is necessary to rectify security gaps in a specific system software version. The duration of the operator data or configuration data may differ from the validity period or life of the certificate Z. This fact can be taken into account when the certificate is regenerated, particularly if the operator data or configuration data are coded directly into the certificate. In addition, it is possible for the operator data or configuration data to be selected in a manner attuned specifically to a particular physical location of the automation device 2 or the logical location thereof within the automation installation 1. In one possible embodiment, this can be achieved by connecting the authentication server 7 to a configuration server 9, which may also contain location-dependent planning data.

In one possible embodiment, the operator data are coded directly into a certificate Z, particularly a device certificate. Here, the size of the certificate can grow, which means that the necessary memory for this needs to be available. In a further possible embodiment, the certificate Z has a device-specific or series-specific serial number that provides sufficient information together with the issuer and the serial number of the certificate Z, so that a server can request the possible operator data or configuration data from the operator of the automation installation 1. In a further embodiment, the certificate Z contains a link to a web page of the installation operator that may store possible device-specific operator data or configuration data in the form of a device configuration database. In a further embodiment, the operator data provided by the operator are digitally signed to protect the integrity of these data, so that they can be used for automation in the planning of installations. In one possible embodiment, the device-specific operator data are written to an attribute certificate for a device certificate of the automation device 2. In one embodiment, it is possible to use the logotype extension in order to code devices or series-specific information as a 1D or 2D barcode. When an attribute certificate is used, a change requires only the attribute certificate to be renewed, this resulting in simplified handling, because no secret cryptographic keys need to be translated in this case. The request for the operator data from a configuration database of the configuration server 9 is made online in one possible embodiment.

In another embodiment, operator data, such as configuration data, are coded directly in a certificate Z.

Figure 2:
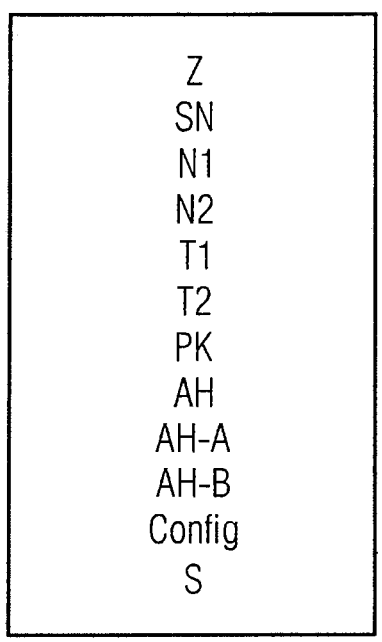
FIG. 2 shows an example of a certificate that is used for the method and the system in accordance with an exemplary embodiment of the invention.

FIG. 2 shows an example of a certificate Z that involves configuration data being coded as an attribute directly in a device certificate Z of an automation device 2. In this case, specific configuration data Config are inserted as further information into a device certificate Z from the manufacturer. By way of example, the configuration information may comprise address information and also device-specific settings, for example a time-out time for the termination of a connection for a communication module or a prescribed speed for a motor that is actuated by the automation device 2. By way of example, the certificate Z has a serial number SN as certificate ID. In addition, the certificate Z contains the name $N_1$ of the entity for which it is issued and the name $N_2$ of the issuer. In addition, the certificate Z outputs a time statement regarding the time from which it is valid and a time statement $T_2$ regarding the time until which it is valid. Furthermore, the certificate Z has a public key Pk and also attributes Att, for example attributes Att-A, Att-B. In one possible embodiment, the certificate Z is signed with a signature S. By way of example, the certificate Z shown in FIG. 2 may be an extended X.509 certificate. When using a certificate Z, as shown in FIG. 2, the method for providing device-specific operator data for an automation device 2 in an automation installation 1, as shown in FIG. 1, for example, occurs as below in one described embodiment.

Initially, the automation device 2 authenticates itself on the automation server 7 to gain access to the network 6. By way of example, the authentication server 7 may be a radius server. For the purpose of authentication, the operator-specific authentication credential of the automation device 2 is used, which is known to the authentication server. If the authentication credential is a certificate, one possible embodiment can involve the use of certificate-based EAP methods, such as EAP-TLS. The authentication credential contains configuration data from the automation device 2 at the specific site of use within the automation installation 1.

Following successful authentication of the automation device 2 to the authentication server 7, the authentication server 7 sends the network access switch 5 a message indicating that it is permitted to interface the automation device 2 to the network 6. Subsequently, address configuration of the automation device 2 can take place.

The authentication server 7 now reports the successful authentication of the authentication device 2 to the policy enforcement server 8. By way of example, this involves the device certificate Z of the automation device 2 being sent as well.

Based on the configuration data that the device certificate Z contains, the policy enforcement server 8 links the current configuration status of the automation device 2 and, in the event of more up-to-date operator data being present, requests these current device-specific operator data from the configuration server 9.

The configuration server 9 can generate a new set of configuration or operator data in line with a plan of action for the automation device 2 and can send these current device-specific operator data to the policy enforcement server 8.

The policy enforcement server 8 takes the public key that the existing device certificate Z contains and the current operator data as a basis for generating a new device certificate and transmits the new device certificate to the authentication server 7. Alternatively, this may also involve the generation of a complete cryptographic key pair that contains a public and a private cryptographic key.

The policy enforcement server 8 transmits the updated device certificate Z' and the configuration or operator data contained therein to the automation device 2. The automation device 2 can then take the updated operator data or configuration data as a basis for reconfiguring itself and register with the network again.

Figure 3:
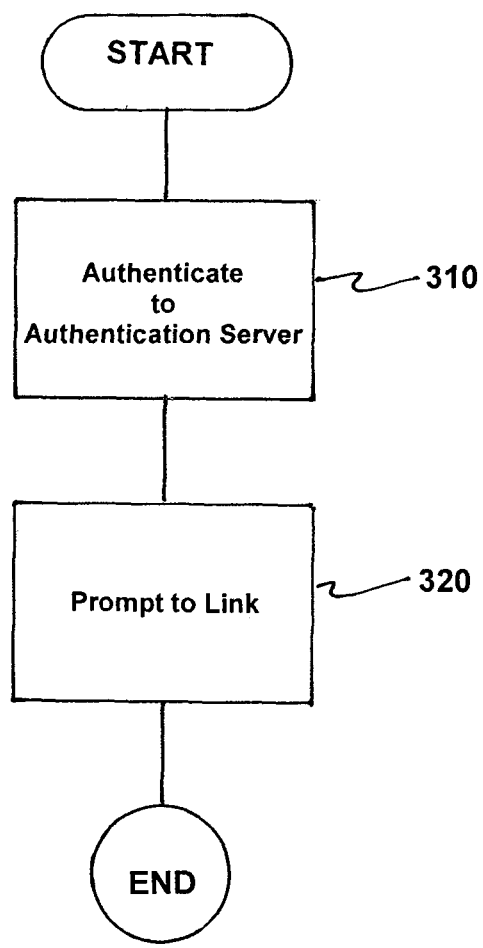
FIG. 3 shows a further example of a certificate that can be used for the method and system in accordance with the invention.
Figure 4:
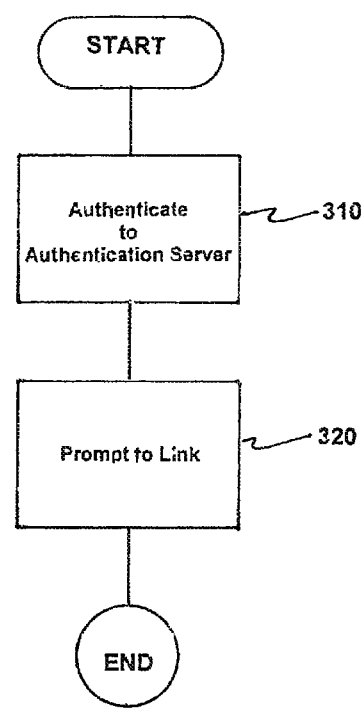
FIG. 4 is a flowchart of the method in accordance with the invention.

In a further possible embodiment of the system and method in accordance with the invention, in the device certificate Z, a configuration link or an address for addressing the current device-specific operator data is written to the device certificate of the automation device 2, as shown in FIG. 3.

In this presently contemplated embodiment, the automation device 2 is likewise initially authenticated with the authentication server 7 to gain access to the network. The authentication credential has a link to the operator data from the automation device 2. Following successful authentication, the authentication server provides the network access switch 5 with an instruction indicating that it is permitted to interface the automation device 2 to the network. The authentication server 7 then reports the successful authentication of the automation device 2 to the policy enforcement server 8. This involves the device certificate Z of the automation device 2 with the link contained therein being sent as well. Using the link to the operator data that is contained in the device certificate Z, the policy enforcement server 8 checks the current configuration status of the automation device 2 and, if required, sends a request to the configuration server 9 in order to obtain the current operator data. In one possible embodiment, the authentication server 7 can generate a new set of operator data or configuration parameters based on the current plan of action of the automation device 2 and can send the current device-specific operator data to the policy enforcement server 8. The configuration server 9 stores the current set of configuration data or operator data for the relevant automation device 2 in line with the information that is indicated in the link of the device certificate Z. The configuration or operator data can be signed to protect their integrity. If the configuration data or operator data are coded in XML, for example, the signature can be provided as part of the XML file. In an alternative embodiment, the link can be transmitted to the policy enforcement server 8. In one embodiment, the link and the operator data or device configuration data are device specific. The policy enforcement server 8 transmits the current device-specific operator or configuration data to the automation device 2. Alternatively, the policy enforcement server 8 can also transmit the link for the configuration or operator data to the automation device 2. When the configuration or operator data are updated, the automation device 2 can finally report this to the policy enforcement server 8 of the automation installation 1.

The execution of security-relevant actions during the use of the automation device 2 in a network protects the general functionality of the automation device 2 against misuse via the connected communication network. In the system in accordance with the invention, it is possible for automation devices 2 to be configured either independently or via a central infrastructure that can take an added automation device 2 as the basis for adapting the system configuration. The embedding in a device certificate Z cryptographically protects the configuration information or operator data. Furthermore, the linking of operator or configuration information to a device type or to a specific automation device 2 can also assist a process of automated inventory management and of policy enforcement for the automation installation 1. In one possible embodiment, the configuration data or operator data are also used as a decision criterion for whether or in which subnetwork the automation device 2 is connected.

FIG. 3 is a flowchart of the method for providing device-specific operator data for an automation device in an automation installation. The method comprises utilizing, by the automation device, at least one authentication credential to authenticate itself to an authentication server in the automation installation, as indicated in step 310.

Based on existence of current device-specific operator data from the installation operator of the automation installation for the automation device, the current device-specific operator data is then prompted to be linked to the authentication credential of the automation device, as indicated in step 320.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing device-specific operator data for an automation device connected to a data network via a network access switch in an automation installation, comprising:

utilizing, by the automation device, at least one authentication credential having a first period of validity to authenticate itself to an authentication server in the automation installation including the data network and the network access switch; and prompting, based on an existence of current device-specific operator data having a second period of validity from an installation operator of the automation installation for the automation device, the current device-specific operator data to be linked to the authentication credential of the automation device and being linked to at least one authentication credential by a policy enforcement server in the automation installation including the data network and the network access switch, said automation device enquiring at regular intervals of time whether current device-specific operator data from the installation operator are existent for the automation device;

wherein the first period of validity of the at least one authentication credential is different than the second period of validity of the current device-specific operator data.

2. The method as claimed in claim 1, wherein the authentication credential is formed by a device certificate of the automation device.

3. The method as claimed in claim 2, wherein the current device-specific operator data for the automation device include at least one of (i) configuration data for configurations of the automation device, (ii) firmware data for the automation device, and (iii) parameter data from devices that are controlled by the automation device.

4. The method as claimed in claim 2, wherein the current device-specific operator data are written to an attribute certificate for the device certificate of the automation device to link the current device-specific operator data to the device certificate of the automation device.

5. The method as claimed in claim 2, wherein the current device-specific operator data are written to an attribute certificate for the device certificate of the automation device to link the current device-specific operator data to the device certificate of the automation device.

6. The method as claimed in claim 2, wherein an address for addressing the current device-specific operator data is written to the device certificate of the automation device to link the current device-specific operator data to the device certificate of the automation device.

7. The method as claimed in claim 6, wherein the address for addressing the current device-specific operator data is ascertained using a device-specific serial number contained in the device certificate of the automation device.

8. The method as claimed in claim 2, wherein the current device-specific operator data are written as coded attribute data to the device certificate of the automation device to link the current device-specific operator data to the device certificate of the automation device.

9. The method as claimed in claim 1, wherein the current device-specific operator data for the automation device include at least one of (i) configuration data for configurations of the automation device, (ii) firmware data for the automation device, and (iii) parameter data from devices that are controlled by the automation device.

10. The method as claimed in claim 9, wherein an address for addressing the current device-specific operator data is written to a device certificate of the automation device to link the current device-specific operator data to the device certificate of the automation device.

11. The method as claimed in claim 9, wherein the current device-specific operator data are written as coded attribute data to a device certificate of the automation device to link the current device-specific operator data to the device certificate of the automation device.

12. The method as claimed in claim 1, wherein the automation device further enquires, when an event occurs, whether current device-specific operator data from the installation operator are existent for the automation device.

13. The method as claimed in claim 1, wherein the policy enforcement server obtains the current device-specific operator data from a configuration server.

14. The method as claimed in claim 13, wherein the policy enforcement server links the current device-specific operator data to the authentication credential after the authentication server has notified the policy enforcement server of a successful authentication of the automation device to the authentication server.

15. The method as claimed in claim 1, wherein the policy enforcement server links the current device-specific operator data to the authentication credential after the authentication server has notified the policy enforcement server of a successful authentication of the automation device to the authentication server.

16. The method as claimed in claim 1, wherein the current device-specific operator data are digitally signed.

17. The method as claimed in claim 1, wherein the at least one authentication credential includes at least one of (i) a device certificate, (ii) a cryptographic key and (iii) a cryptographic key pair.

18. A system for providing device-specific operator data for an automation device connected to a data network via a network access switch in an automation installation having a policy enforcement server and an authentication server, the automation device utilizing at least one authentication credential having a first period of validity to authenticate itself to the authentication server in the automation installation, and said automation device enquiring at regular intervals of time whether current device-specific operator data having a second period of validity from the installation operator are existent for the automation device; wherein an existence of current device-specific operator data from an installation operator of the automation installation for the automation device prompts the current device-specific operator data to be linked to the authentication credential of the automation device by a policy enforcement server in the automation installation including the data network and the network access switch; and wherein the first period of validity of the at least one authentication credential is different than the second period of validity of the current device-specific operator data.

19. The system as claimed in claim 18, wherein the policy enforcement server obtains the current device-specific operator data from a configuration server and links the obtained current device-specific operator data to the authentication credential of the automation device as soon as the policy enforcement server is notified of a successful authentication of the automation device to the authentication server of the automation installation.

20. The system as claimed in claim 19, wherein the automation device includes one of an automation controller, a PLC controller and a field device.

21. The system as claimed in claim 18, wherein the automation device includes one of an automation controller, a PLC controller and a field device.

* * * * *